Feb. 9, 1937.                    W. SLUMAN                    2,069,782
                    MEANS FOR DEFROSTING REFRIGERATORS
                          Filed Jan. 30, 1933
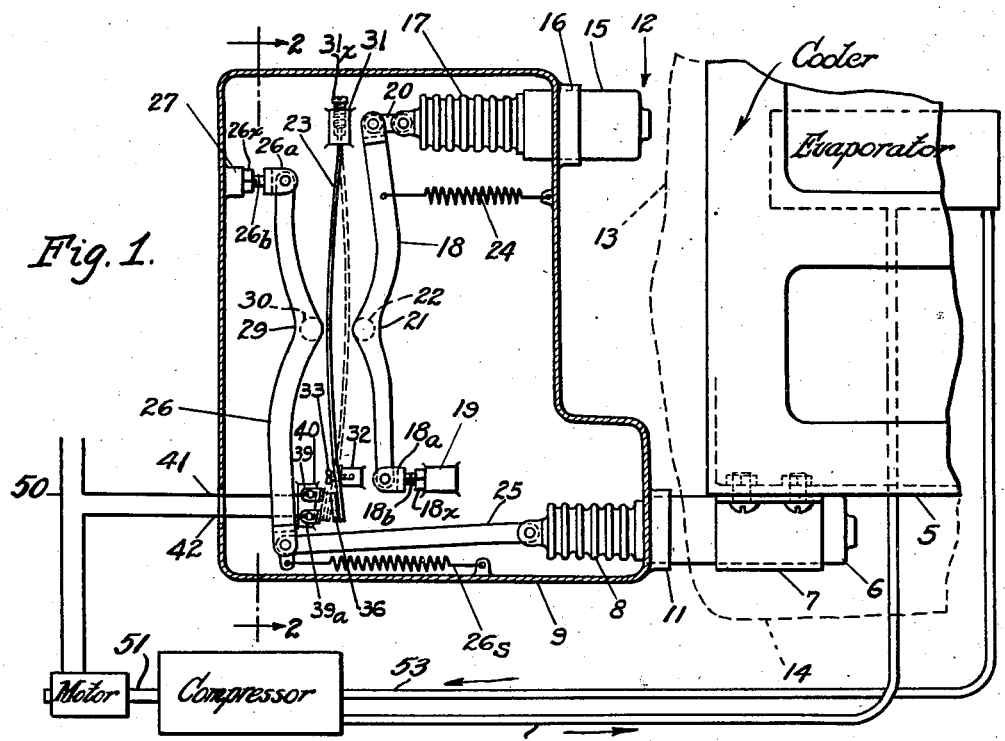
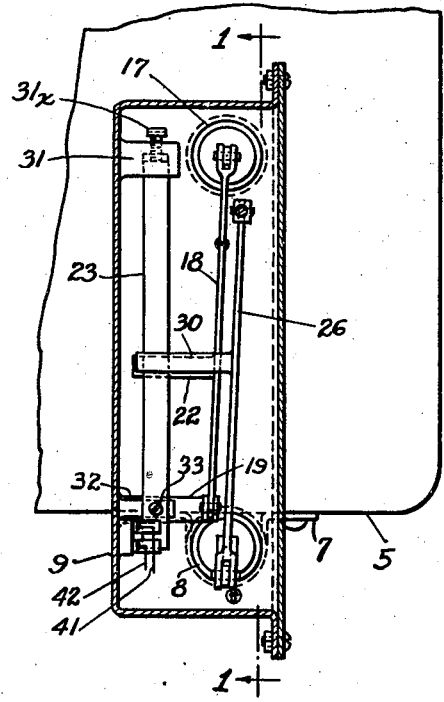
INVENTOR.
William Sluman
BY Robt. W. Pearson
ATTORNEYS.

Patented Feb. 9, 1937

2,069,782

UNITED STATES PATENT OFFICE 2,069,782

MEANS FOR DEFROSTING REFRIGERATORS

William Sluman, Montebello, Calif.

Application January 30, 1933, Serial No. 654,318

4 Claims. (Cl. 62—4)

This invention relates to a means for defrosting mechanical refrigerators.

An object of the invention is to provide an improved means of the character stated which may readily be applied to the cooling units of refrigerators now on the market without materially changing the construction of the refrigerator proper.

It is an object of the invention to provide a defrosting attachment that will be operated directly by the accumulation of frost or ice upon a cooling unit to automatically discontinue the refrigerating action, and which, as soon as the frost has disappeared to the desired extent, will again automatically put into operation the action of the refrigerating element.

The invention is shown applied to an electric refrigerating unit; but it is to be understood that it may be used in conjunction with other types of refrigerators without departing from the scope of the invention as set forth in the claims.

Other objects of the invention are to provide a very simple, compact arrangement of thermostatically controlled devices which automatically regulate the extent of frost accumulation as desired.

Other objects, advantages and features of the invention may hereinafter appear.

Referring to the accompanying drawing which illustrates what is at present deemed to be a preferred embodiment of the invention, Fig. 1 is a side elevation of the attachment shown in section on line 1—1 of Fig. 2 showing the same connected with the lower portion of a refrigerating unit, only a fragment of the unit being shown. The electric refrigerating means is diagrammatically shown.

Fig. 2 is a vertical section taken on line 2—2 of Fig. 1.

Referring in detail to the drawing, the refrigerating unit 5 has secured thereto a bellows type thermostat 6 by means of a clip 7. Said thermostat 6 is of a tubular shape and the bellows portion 8 thereof projects outwardly beyond the corner portion of the unit 5 to which said thermostat is attached. Between said bellows portion 8 and the corner of the unit 5 there intervenes a part of the body portion of the thermostat and to this part is secured a small relatively light casing 9, said casing having a short sleeve portion 11 within which fits the thermostat 6 and which is secured to said thermostat by solder or other suitable means not shown in detail.

The upper portion of said casing 9 is somewhat narrower than the lower portion thereof thereby providing a recess or space 12 between the unit 5 and the casing 9. Within this space 12 the frost or ice body 13 may accumulate as indicated by broken lines in Fig. 1. A frost body 14 in the lower portion of Fig. 1, also indicated by broken lines, serves to operate the lower thermostat 6, while the upper frost body portion 13 acts upon the auxiliary or upper thermostat 15.

Said thermostat 15 is mounted in the upper portion of the casing 9 and is supported by a short sleeve 16 in such a manner that the body portion of the thermostat projects towards the unit 5 while the bellows portion 17 thereof is contained within the casing 9. To the end of the bellows portion 17 of the thermostat 15 is connected the upper control lever 18, said lever being pivotally supported at its lower end by means of a bracket 19. The preferred means for connecting the lower end of the lever 18 with the bracket 19 consists of a clip 18a pivoted to the lower end of said lever, a screw bolt 18b to which said clip is swivelled, screwing into the bracket or post 19, and a lock nut 18x to secure the bolt in the adjusted position. A pivotally mounted link 20 is used to connect said lever with the bellows 17 in order to secure the necessary vertical play during operation of the lever. In spaced relation to its lower end said lever 18 is bent outwardly as shown at 21 and upon the outer end is provided with a finger or trip portion 22 which is operatively related to the contact making and breaking spring 23. A retracting spring 24 tends to retract the upper end of the lever 18 in opposition to the action of the bellows portion 17 of the thermostat 15.

Referring now to the thermostat 6, the bellows portion 8 of said thermostat is connected by means of a relatively long link 25 to the lower end of a lever 26. Said lever is pivotally supported at its upper end by means of a bracket 27. The preferred means for securing the upper end of the lever 26 to the bracket 27 consists of a clip 26a, screw bolt 26b and lock nut 26x of the same character as the corresponding parts which were described in connection with the lower end of the lever 18. Between its ends said lever 26 is provided with a rise 29 and trip finger 30. Said trip finger 30 is operatively related to the leaf spring 23 already referred to. The lever 26 is provided with a spiral retracting spring 26s.

The upper end of leaf spring 23 is secured to a lug or bracket 31 and the lower end of said spring is loosely secured to a bracket 32 by a screw 33, said bracket 32 being secured to the wall of the casing 9. The leaf spring is thus supported under a longitudinal compression which compels it to bow towards one side or the other at all times. The portion of the leaf spring which extends below the bracket 32 is provided with a contact or circuit completing member 36. Said member 36 cooperates with stationary contacts or terminals 39 and 39a which are carried by a bracket 40. The contact 39 is connected with the line wire 41 and the contact 39a is connected with the line wire 42. When the terminals 39 and 39a are engaged by the contact 36, the circuit is completed to provide the current for refrigeration, but otherwise the circuit is broken and the refrigerating action ceases.

A screw 31x is provided at the upper end of the leaf spring 23 to regulate the extent of the buckle of said spring. The terminals 39 and 39a are adjustably mounted in order to insure that they cooperate properly with the circuit completing member 36, said member 36 being insulated from the leaf spring.

The circuit is completed through the motor by the line wire 50. The motor is shown operatively connected with the compressor by means of a drive shaft 51, and the compressor communicates with the evaporator by means of the supply pipe 52 and the return pipe 53.

The purpose of the device is to automatically defrost the cooling unit. The automatic action is produced when the upper portion 13 of the frost body on the side of the cooling unit contacts the upper bulb, which contains a freezing solution said solution expanding when frozen and contracting when warmed. Such freezing action expands the movable portion or bellows 17 thereby moving the leaf spring 23 beyond dead center whereupon the contacts carried thereby open the electric current and stop the refrigerating machine.

The circuit is again closed only when the lower thermostat 6 has contracted. This latter action can take place only after the ice is practically all melted from the cooling unit, and when it occurs it causes the lever 26 to bow the leaf spring 23 toward the right, resulting in closing the electric circuit and thereby starting the refrigerating machine operating. The defrosting process is thus repeated from time to time as required.

I claim:

1. In combination, a refrigerating unit, a main thermostat connected with said unit in a position to be acted upon by the temperature of said unit at all times during the operation thereof, an auxiliary thermostat in position to be acted upon when frost accumulates upon said unit to a predetermined extent, a contact making and breaking leaf spring supported by its end portions under a constraint requiring it to bow toward one side or the other, means operatively connecting said thermostats with the intermediate portion of said spring to cause it to be bowed toward one side under the action of the main thermostat and to be bowed to the reverse side under the action of the auxiliary thermostat, conductors forming an electric circuit to cause refrigeration within said unit, and circuit opening and closing means for said circuit governed by the position of said leaf spring.

2. In combination, a cooling unit, a main thermostat connected with said unit in a position to be constantly acted upon by the temperature thereof, an auxiliary thermostat slightly spaced away from the outside surface of said unit in a position to be contacted by frost accumulating upon said unit, electrical refrigerating means for said unit, conductors to supply an electric current to said means, a circuit opening and closing device for said conductors, said device being movable by said main thermostat in one direction into a position wherein it closes the circuit through said conductors, and said device being movable by the auxiliary thermostat into a position wherein it temporarily opens the circuit through said conductors.

3. In combination, a refrigerating unit, a cooling unit in said refrigerating unit having a casing, a main thermostat connected with said casing in a position to be constantly acted upon by the temperature thereof, a lever having a free end operatively connected with said thermostat, means to pivotally support said lever from its other end, an auxiliary thermostat mounted in spaced relation to said casing sufficiently near thereto to be contacted by a frost or ice body accumulating thereon, said auxiliary thermostat being located at a higher level than said main thermostat, a second lever having a free end with which said auxiliary thermostat is operatively connected, means by which the other end of said second lever is pivotally supported, said levers extending in a general parallelism to each other, a leaf spring means mounted between said levers under a constraint causing it to bow toward one or the other of said levers at all times, said levers being constructed and arranged to operate said leaf spring in reverse directions, conductors to provide an electric circuit for said refrigerating unit, and circuit making and breaking means operable by said leaf spring to control the circuit through said conductors.

4. The subject matter of claim 3 and means to vary the extent of the buckle in said leaf spring.

WILLIAM SLUMAN.